US007628963B2

(12) United States Patent
Woo et al.

(10) Patent No.: US 7,628,963 B2
(45) Date of Patent: Dec. 8, 2009

(54) SMALL CYLINDRICAL REFORMER

(75) Inventors: Tae Woo Woo, Daejeon (KR); Young Seek Yoon, Daejeon (KR); Seong Ho Lee, Daejeon (KR); Il Su Kim, Daejeon (KR); Keun Seob Choi, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 554 days.

(21) Appl. No.: 11/296,061

(22) Filed: Dec. 6, 2005

(65) Prior Publication Data

US 2006/0117660 A1      Jun. 8, 2006

(30) Foreign Application Priority Data

Dec. 7, 2004   (KR) ................ 10-2004-0102501

(51) Int. Cl.
*B01J 8/04* (2006.01)
(52) U.S. Cl. ............... 422/190; 422/197; 422/198; 422/211; 422/196; 422/188; 422/212; 48/94; 48/61; 48/89; 48/127.9; 429/19; 429/20
(58) Field of Classification Search ........... 422/211, 422/197, 198, 196
See application file for complete search history.

(56) References Cited

U.S. PATENT DOCUMENTS

| 5,932,181 A | 8/1999 | Kim et al. |
| 6,117,578 A | 9/2000 | Lesieur |
| 6,481,207 B2 | 11/2002 | Miura et al. |

FOREIGN PATENT DOCUMENTS

KR   1020020082061 A   10/2002

*Primary Examiner*—Jennifer Michener
*Assistant Examiner*—Kaity V. Handal
(74) *Attorney, Agent, or Firm*—Darby & Darby PC (57) ABSTRACT

A small cylindrical reformer according to the embodiments of the present invention are suitable for use in the production of hydrogen from fossil fuels for a small fuel cell power plant. In the small cylindrical reformer, a reforming reactor, a water gas shift reactor (high temperature or low temperature), a combustor, a heat exchanger, a steam generator, etc., may be integrated in a single container to form an optimal heat exchanging network, minimize heat loss and optimize heat exchange efficiency. Thereby, the reformer is designed to be easily processed and manufactured and to have a compact size, thus realizing high efficiency, light weight and ease of mass production.

21 Claims, 5 Drawing Sheets

SMALL CYLINDRICAL REFORMER

INCORPORATION BY REFERENCE

The present application claims priority under 35 U.S.C. §119 to Korean Patent Application No. 10-2004-0102501 filed on Dec. 7, 2004. The content of the application is incorporated herein by reference in its entirety.

BACKGROUND OF THE INVENTION

1. Field of the Invention

The present invention relates to a small cylindrical reformer, suitable for use in the production of hydrogen from fossil fuels for a small fuel cell power plant, in which a reforming reactor, a water gas shift reactor (high temperature or low temperature), a combustor, a heat exchanger, a steam generator, etc., may be integrated in a single container to form an optimal heat exchanging network, minimize heat loss and optimize heat exchange efficiency, whereby the reformer is designed to be easily processed and manufactured and to have a compact size, resulting in high efficiency, light weight and ease of mass production.

2. Description of the Related Art

Presently, as the type of fuel to be consumed is gradually moving toward clean fuel having a high hydrogen/carbon-atom ratio and a low pollution level, an industrial society based on hydrogen as a harmless clean fuel is expected to arise quickly. In industrial fields, hydrogen has already been applied to ammonia synthesis, methanol synthesis, petroleum refining (dehydrogenation, hydrogenation, etc.), general and fine chemical industries, electronic and semiconductor industries, food and metal processing industries, etc. Further, in the energy fields, hydrogen is used as the fuel of fuel cells for home or power plants and of power supply sources for fuel cell automobiles, being able to solve at one time problems, related to a propellant, electric power supply and energy efficiency of a space shuttle, in which an internal combustion engine is not used, and to environmental pollution, at one time.

Presently available methods of preparing hydrogen include, for example, steam reforming, partial oxidation or autothermal reforming of fossil fuel (coal, petroleum, natural gas, propane, butane), and water electrolysis. Although hydrogen may be obtained from a by-product gas of a petroleum refining process, the steam reforming method is regarded as an economical application technique which is most widely used commercially.

In the case where the steam reforming method is applied to produce hydrogen on a large scale, a reforming reactor may be operated at a high pressure (15-25 bar) and high temperature (850° C. or higher). Thereby, hydrogen may be desirably produced, but the total efficiency thereof is low. In addition, when producing hydrogen on a small scale, the installation cost may be drastically increased. In addition, the apparatus may be enlarged for stable operation, and each process may be separately conducted, thus it is difficult to increase heat efficiency due to the limitation in combining heat.

Hence, in order to solve the above drawbacks of reformers for home or commercial small fuel cell systems, attempts have been made to combine each process, develop a catalyst suitable for a small fuel cell system, optimize the reformer using a heat flow analysis, simplify the structure of the reformer to increase processability and productivity, and integrate constituents of the reformer to decrease the size thereof, so as to reduce initial start-up time and heat loss and increase heat efficiency.

In this regard, U.S. Pat. No. 5,932,181 discloses a hydrogen generator using a cylindrical combustion catalyst, which comprises a desulfurization reactor, a reforming reactor, a water gas shift reactor, a pressure swing absorption unit, etc. This patent is advantageous because the number of parts of equipment is decreased so that the space necessary to set it up may be reduced to miniaturize the generator, and the manufacturing cost is drastically decreased, and also efficiency and start-up time may be improved by heat exchanging the desulfurization reactor. In the above generator, heat generated from the desulfurization reactor, the reforming reactor, the steam generator and the combustor may be combined together, however heat generated from the water gas shift reactor and the subsequent parts cannot be combined, thus decreasing the total heat efficiency and increasing the size of the device.

In addition, U.S. Pat. No. 6,117,578 discloses a reformer for fuel cell power plants using two heat supply sources of a combustion catalyst or a burner, in which a combustion catalyst and a reforming catalyst are applied on the wall in the reformer to maximize catalyst efficiency, and thus, the reformer may be operated even at a low temperature. Thereby, reaction operation conditions become mild. However, high heat efficiency is difficult to obtain, due to the lack of combination of post processes.

Korean Patent Laid-open Publication No. 2002-82061 discloses a compact steam reformer using a cylindrical metal fiber burner, in which a reactor, a heat exchanger and a steam generator may be integrated, realizing the compact steam reformer. Further, as the heat supply source necessary for reforming, the cylindrical metal fiber burner is used for uniform heating, whereby the temperature gradient of the catalyst layer in the reforming reactor may be reduced to maximize reforming efficiency. Also, since steam is generated using a combustion exhaust gas, energy efficiency increases, and an additional steam generator is not needed, resulting in a highly simplified system and decreased device and operation costs. However, in the above reformer, a heat streaming is not optimized, and the exhaust gas stream should be accurately controlled during operation. Further, excessive fuel is consumed, and heat generated from the water gas shift reactor and the preferential oxidation reactor is not recovered, decreasing the heat efficiency. Furthermore, heat exchange between the exhaust gas and the steam results in an undesirably enlarged reformer.

Recently, U.S. Pat. No. 6,481,207 discloses a cylinder type reformer for use in maximizing heat efficiency, in which a burner is provided at the central upper portion of the reformer, and a plurality of cylinders are sequentially radially disposed from the highest temperature region to the lowest temperature region to maximally suppress heat loss. In addition, the cylinders are attempted to be integrated while increasing heat efficiency by conducting heat exchange therebetween. The reformer is designed in such a way that the reactor is axially positioned so as to enable the cylinder type reforming reactor to resist thermal deformation. In the above reformer, a preheating layer and a heat recovery layer are provided for effective heat exchange. However, there is no means for preheating air, and also many spaces for liquid stagnation are present in the structure, and hence, problems may occur when water is not completely evaporated or the product is condensed. Further, the above reformer is not easy to manufacture due to its complicated structure.

SUMMARY OF THE INVENTION

Accordingly, the present invention has been made keeping in mind the above problems of the small reformers occurring in the prior art, and an object of the present invention is to provide a small cylindrical reformer, which comprises a reforming reactor, a water gas shift reactor (high temperature or low temperature), a combustor, a heat exchanger, a steam generator, etc., integrated in a single container to form an optimal heat exchanging network capable of exhibiting excellent performance.

Another object of the present invention is to provide a small cylindrical reformer, which is structured to minimize heat loss and exhibit optimal heat exchange efficiency, whereby the reformer has high heat efficiency despite having a compact size, is easily processed and manufactured, and simplifies a fluid stream flowing therein to minimize stagnation spaces, resulting in high efficiency, light weight, and ease of mass production.

In order to accomplish the above objects, the present invention provides a small cylindrical reformer, comprising a combustion reaction unit, which includes a combustion part to burn air and fuel supplied from an air/fuel inlet, a combustion gas distributor to distribute the combustion gas generated in the combustion part, and a first combustion gas passage and a second combustion gas passage to guide the distributed combustion gas into an outlet to be discharged; and a fuel-converting catalytic reaction unit, which includes two reforming reaction parts each having a reforming catalyst to reform feed and water supplied from a feed/water inlet, to prepare a reforming reaction reformate, and a water gas shift reaction part formed between the two reforming reaction parts to decrease the concentration of carbon monoxide in the reforming reaction reformate, to prepare a water gas shift reformate, in which the combustion reaction unit and the fuel-converting catalytic reaction unit are integrally structured by six cylindrical pipes to realize optimal heat exchange efficiency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, a detailed description will be given of the embodiments of the present invention, with reference to the appended drawings.

Figure 1:
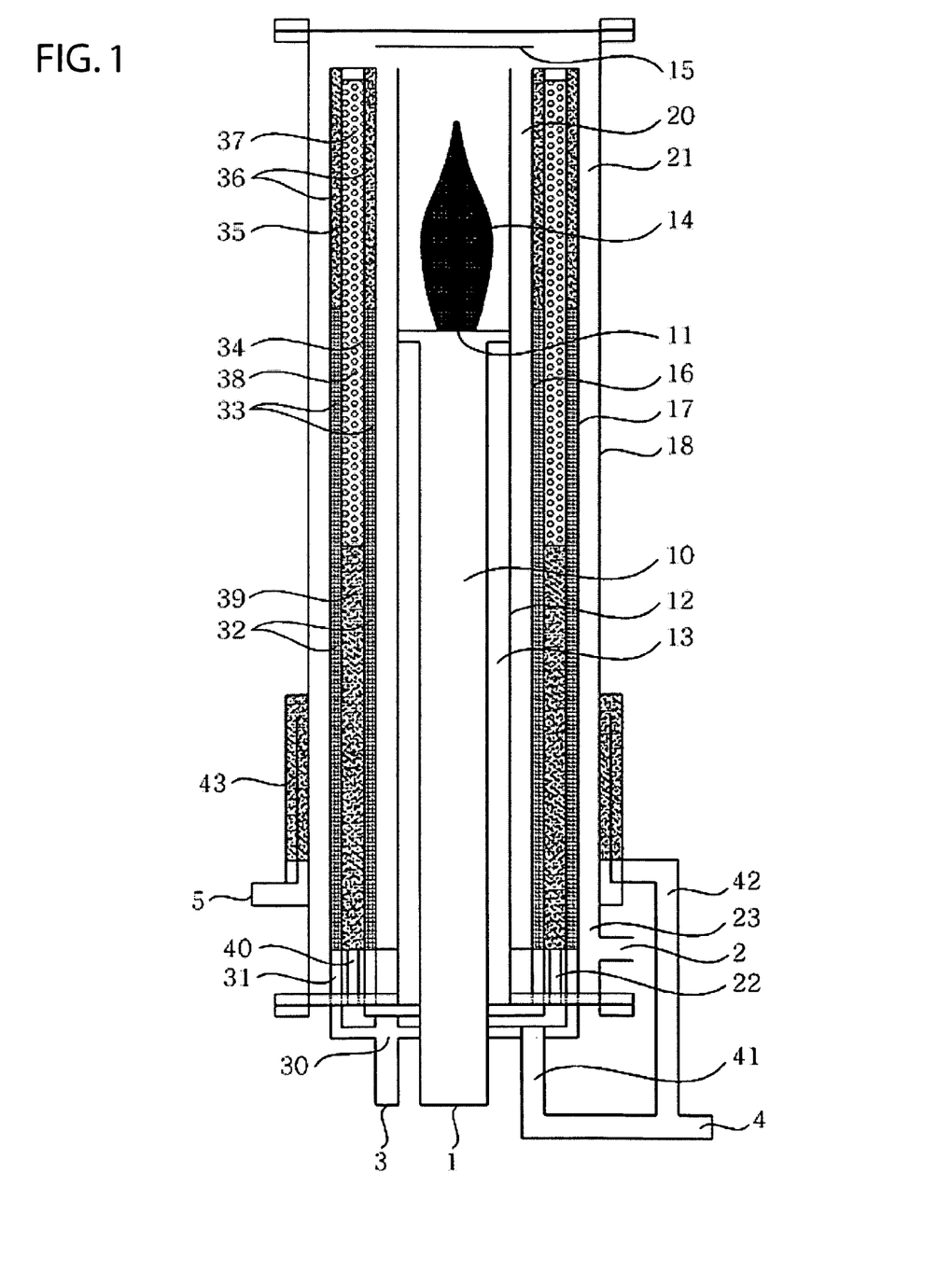
FIG. 1 is a longitudinal sectional view showing the internal structure of a small cylindrical reformer, according to an embodiment of the present invention.
Figure 2:
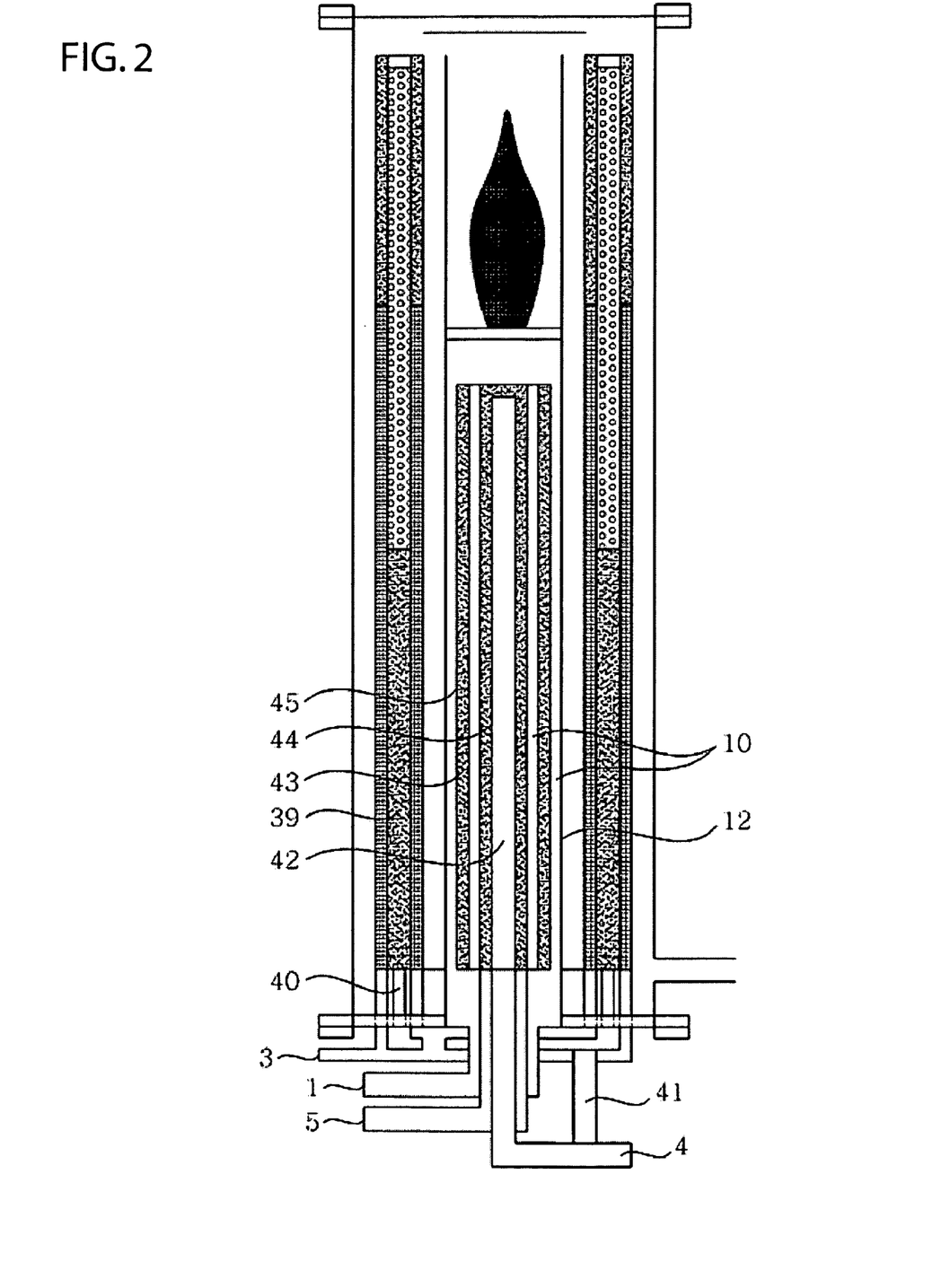
FIG. 2 is a longitudinal sectional view showing the internal structure of a small cylindrical reformer, according to another embodiment of the present invention.
Figure 3:
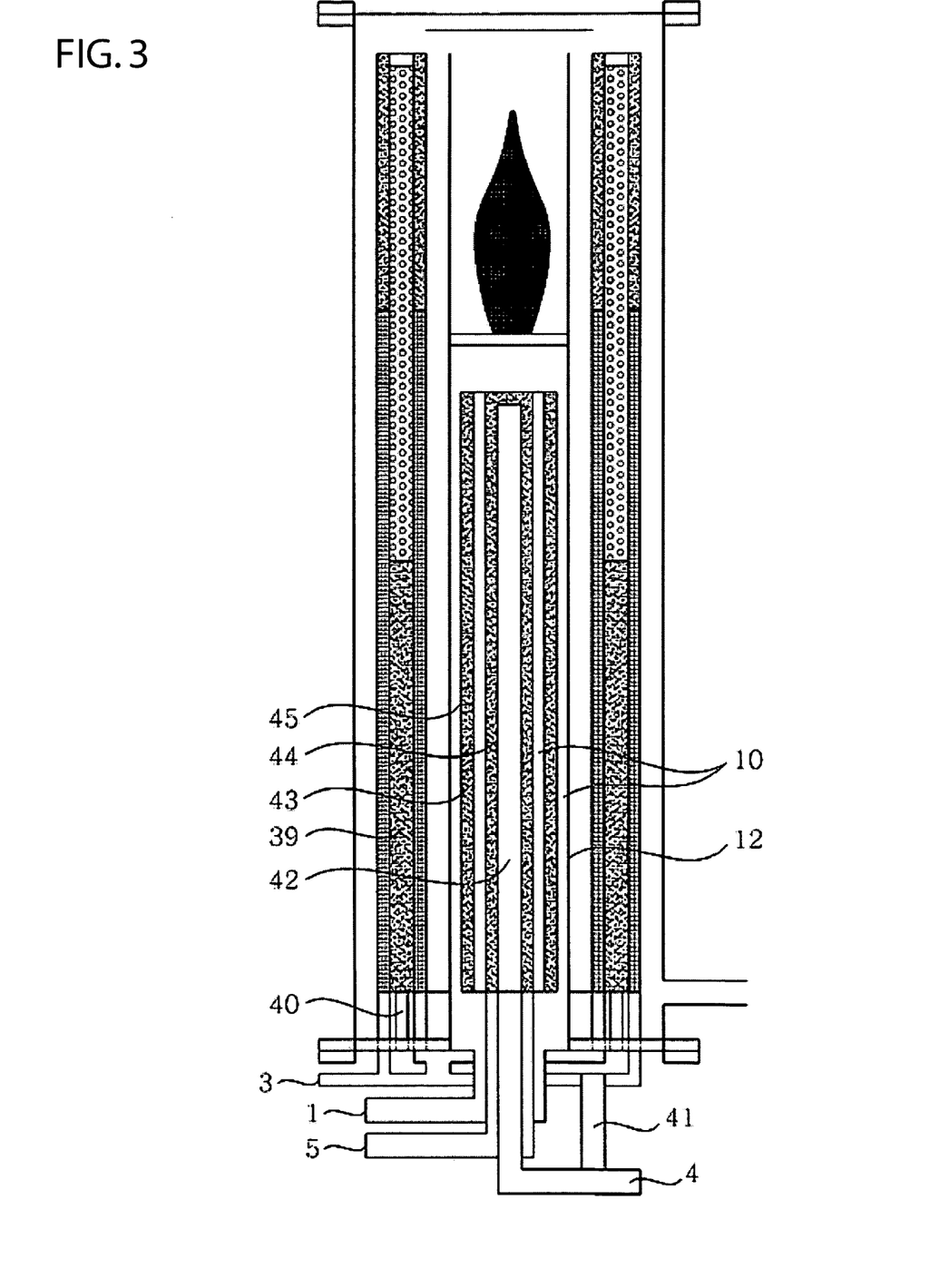
FIG. 3 is a longitudinal sectional view showing the internal structure of a small cylindrical reformer, according to yet another embodiment of the present invention.
Figure 4A:
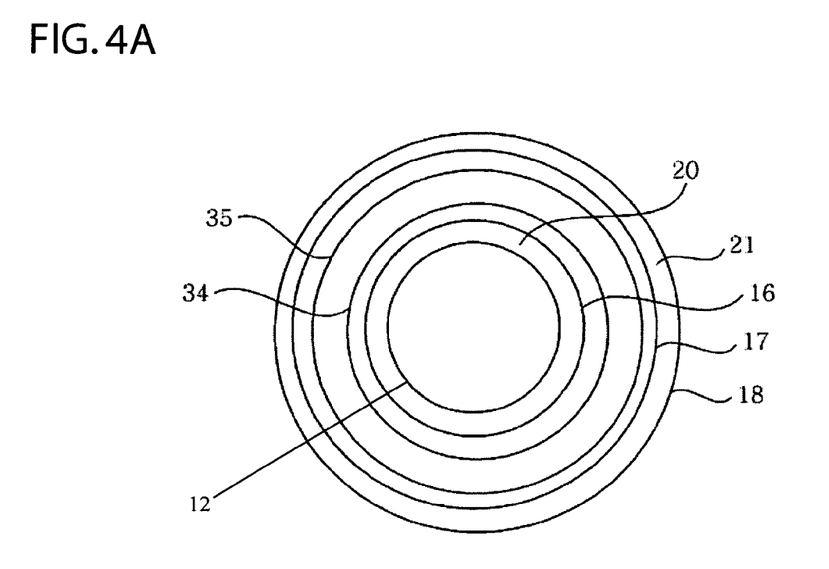
FIG. 4A is a transverse sectional view showing the small cylindrical reformer according to the embodiment of FIG. 1.
Figure 4B:
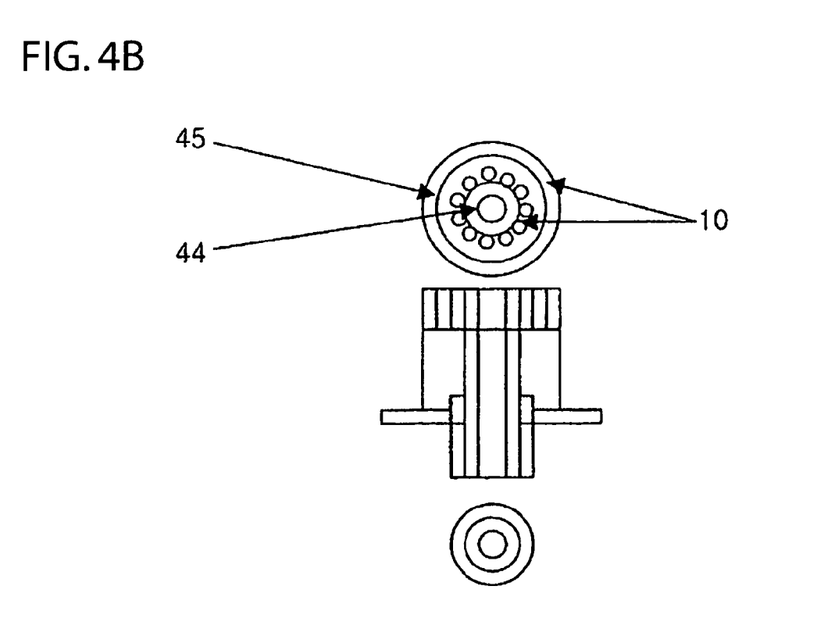
FIG. 4B is a transverse sectional view showing the small cylindrical reformer according to the embodiment of FIG. 2.
Figure 5:
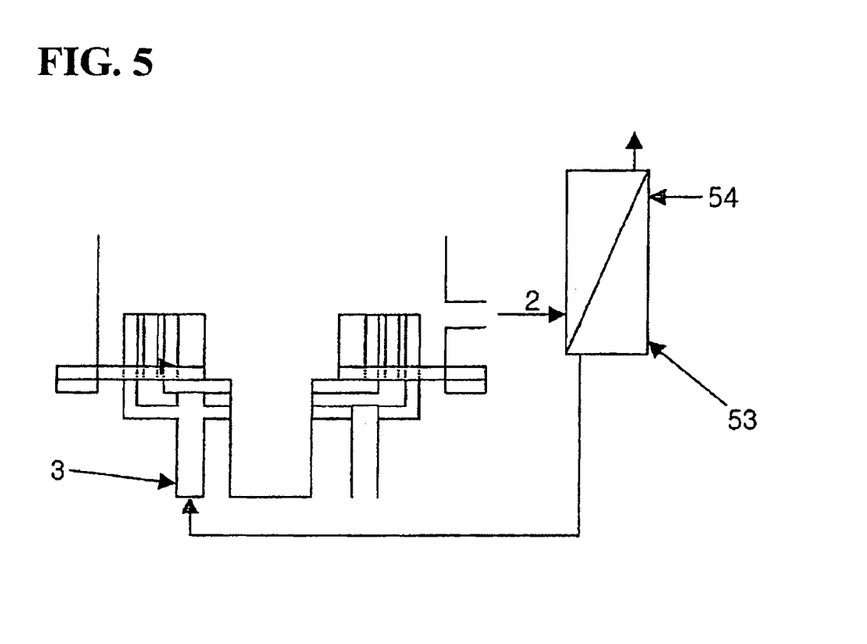
FIG. 5 is a schematic view showing a small cylindrical reformer further comprising a heat exchanger, according to an embodiment of the present invention.

FIG. 1 is a longitudinal sectional view showing the internal structure of a small cylindrical reformer, according to an embodiment of the present invention. FIGS. 2 and 3 are longitudinal sectional views showing small cylindrical reformers, according to further embodiments of the present invention. FIGS. 4A and 4B are transverse sectional views showing the small cylindrical reformers, according to the embodiments of FIGS. 1 and 2, respectively. FIG. 5 is a schematic view showing a small cylindrical reformer further comprising a small heat exchanger, according to an embodiment of the present invention.

Referring to FIG. 1, the small cylindrical reformer is specifically explained. The small cylindrical reformer comprises two units, that is, a combustion reaction unit and a fuel-converting catalytic reaction unit. The combustion reaction unit includes a combustion part to burn air and fuel supplied from an air/fuel inlet 1, a combustion gas distributor 15 to distribute the combustion gas burned in the combustion part, and first and second combustion gas passages 20 and 21 to guide the distributed combustion gas into an outlet 2 to be discharged. In addition, the fuel-converting catalytic reaction unit is composed of two reforming reaction parts, each including a reforming catalyst to reform feed and water supplied from a feed/water inlet 3, and a water gas shift reaction part, formed between the two reforming reaction parts to conduct a water gas shift reaction so as to decrease the concentration of carbon monoxide in a reforming reaction reformate obtained through the reforming reaction.

Moreover, the combustion reaction unit and the fuel-converting catalytic reaction unit are integrally structured as six cylindrical pipes to realize optimal heat exchange efficiency. Thereby, a network for optimal heat exchange efficiency may be achieved. Further, the fuel-converting catalytic reaction unit may further comprise a preferential oxidation reactor outside the two reforming reaction parts or at the outside thereof to decrease the content of carbon monoxide discharged from the water gas shift reaction part to a predetermined level or lower.

In the small fuel reformer thus structured, the combustion part includes a first air/fuel preheating passage 10, a combustion chamber 14, and an air preheating tube 13 provided around the first air/fuel preheating passage 10 to preheat air. The first air/fuel preheating passage 10 is a space where the air and fuel supplied from the air/fuel inlet 1 are preheated before being introduced into the combustion chamber 14. As such, the preheating process minimizes the heat requirement of the combustion chamber 14. Such a preheating process is conducted using the air preheating tube 13 provided around the first air/fuel preheating passage 10, in which heat stored in the air preheating tube 13 is obtained via a first combustion gas passage 20 to guide the combustion gas burned in the combustion chamber 14 to be externally discharged.

The air and fuel passed through the first air/fuel preheating passage 10 are supplied into the combustion chamber 14 to burn them. The combustion gas thus obtained is uniformly distributed into the first combustion gas passage 20 and the second combustion gas passage 21 using the combustion gas distributor 15 provided at the upper portion of the combustion chamber 14. The combustion gas distributor 15 is sheet-shaped so as to realize appropriate distribution into the first combustion gas passage 20 and the second combustion gas passage 21.

The distributed combustion gas is guided into the exhaust gas outlet 2 through the first combustion gas passage 20 and the second combustion gas passage 21, and is then discharged. The first combustion gas passage 20 and the second combustion gas passage 21 function to transfer heat into the two reforming reaction parts formed therebetween. In particular, the first combustion gas passage 20 is used to transfer heat into the air preheating tube 13, in addition to transferring heat into the reforming reaction part, to maximally utilize heat of the discharged combustion gas. Further, the second combustion gas passage 21, through which the combustion gas is passed, directly contacts a fourth pipe 18 forming the reformer. Hence, $Al_2O_3$ may be deposited on the internal surface of the fourth pipe 18, using Al alloy or clad metal material, or ceramic material may be attached thereto for heat insulation at a high temperature region. Thereby, heat loss may be minimized or oxidation corrosion due to the combustion gas may be prevented.

The first air/fuel preheating passage 10 and the first and second combustion gas passages 20 and 21 have variable spaces between them for appropriate heat exchange. As such, a heat transfer increasing material, formed of a metal in such a way that pressure drops only slightly, may be inserted to increase heat exchange efficiency. In addition, a support may be inserted to maintain the above space at a predetermined level and increase heat transfer. The metal support may be formed of spherical metal balls, metal mesh having a predetermined lattice size, or woven metal to prevent lop-sided channeling of a gas stream so as to induce a smooth stream. As such, a metal material, which is not deformed at a high temperature, does not heat expand, and does not corrode due to surface oxidation, may be selected, and preferably, a product made of stainless steel may be used.

The fuel-converting catalytic reaction unit of the reformer consists of the two reforming reaction parts, the water gas shift reaction part formed between the two reforming reaction parts, and the preferential oxidation reactor. Of these parts, the reforming reaction part is first explained. Namely, the two reforming reaction parts each include a feed/water preheater 32 to preheat feed and water supplied from a feed/water inlet 3, a feed/water superheater 33 to superheat the preheated feed and water, and a reforming reactor 36 to conduct the reforming reaction of the superheated feed and water.

Specifically, the feed and water supplied from the feed/water inlet 3 are introduced into the reforming pipes through feed/water passages 30 and 31, so that they are preheated and superheated using the feed/water preheaters 32 and the feed/water superheaters 33 while moving upwards. The preheating and superheating processes are conducted by heat exchange with the first and second combustion gas passages 20 and 21 formed around the reforming reaction part, and further by heat exchange with the water gas shift reaction part formed between the two reforming reaction parts. The feed/water preheater 32 and the feed/water superheater 33 are filled with ceramic balls having a diameter such that pressure drops only slightly. The ceramic filler may be in the form of spheres, flakes, or cylinders. Preferably, for a smooth fluid stream, the spherical ceramic filler may be used, the diameter of which has a size ranging from $1/10$ to $1/3$ of the filling space, without exceeding an error range of 10%. Moreover, it is preferable that a filler product composed only of a main component, such as alumina, silica or magnesia, or of a mixture comprising the main component, selected from among alumina, silica, magnesia and combinations thereof, and an auxiliary component, be used, in consideration of heat exchange efficiency. The feed/water preheater 32 and the feed/water superheater 33 perform double heat exchange with the first and second combustion gas passages 20 and 21 and with the water gas shift reaction part, to realize optimal heat transfer efficiency.

The feed passed through the superheaters 33 is supplied into the reforming reactors 36 and contacts the steam reforming catalysts loaded therein to conduct a reforming reaction, and is thus converted into a reforming reaction reformate comprising hydrogen, carbon monoxide, carbon dioxide and water. The reforming catalyst causing the above reaction includes, for example, an Ni-based steam reforming catalyst, or an Ni-based steam reforming catalyst containing at least 0.01 wt % precious metal such as Pt or Ru. The diameter of the reforming catalyst preferably has a size ranging from $1/10$ to $1/3$ of the space defining the reforming reaction part, in consideration of pressure drop and reactivity in the pipes.

The reforming reaction reformate formed through the two reforming reaction parts is supplied into the water gas shift reaction part between the two pipes, in which the water gas shift reaction part includes a first reforming reaction reformate passage 37 and a second reforming reaction reformate passage 38 to conduct efficient heat exchange so that the temperature of the reforming reaction reformate passed through the reforming reaction parts decreases to a predetermined level, and a water gas shift reactor 39 to decrease the concentration of carbon monoxide in the above reforming reaction reformate to a predetermined level or lower.

The first reforming reaction reformate passage 37 and the second reforming reaction reformate passage 38, acting similarly to the preheaters and superheaters formed in the two reforming reaction parts, are used to decrease the temperature of the reforming reaction reformate, produced through the reforming reaction parts, via appropriate heat exchange, and therefore, are filled with ceramic balls having a diameter such that pressure drops only slightly as in the feed/water preheater 32 and the feed/water superheater 33. The ceramic filler may be in the form of spheres, flakes, or cylinders. In particular, for a smooth fluid stream, the spherical ceramic filler may be preferably used, the diameter of which has a size ranging from $1/10$ to $1/3$ of the filling space, without exceeding an error range of 10%. In consideration of the heat exchange efficiency, as the filler, a product composed only of a main component such as alumina, silica, or magnesia, or of a mixture comprising a main component selected from among alumina, silica, magnesia and combinations thereof and an auxiliary component may be preferably used. The use of such an internal material permits the heat transfer efficiency to increase, heat to be stored or the temperature to be uniformly maintained in the predetermined range.

The reforming reaction reformate resulting from the reforming reaction, which is decreased in the temperature by passing through the first reforming reaction reformate passage 37 and the second reforming reaction reformate passage 38, is supplied into the water gas shift reactor 39. Thereby, the above reformate is subjected to a water gas shift reaction while contacting the water gas shift catalyst, so that the concentration of carbon monoxide in the reformate is decreased from 7-15% to 0.3-1.0%. As such, the water gas shift catalyst causing the above reaction includes, for example, an Fe—Cr-based high temperature shift catalyst, a Cu—Zn-based low temperature shift catalyst, or a water gas shift catalyst containing at least 0.01 wt % precious metal such as Pt or Pd. The diameter of the catalyst has a size ranging from $1/10$ to $1/3$ of the space defining the water gas shift reaction part, in consideration of pressure drop and reactivity in the pipes.

The water gas shift reformate produced through the water gas shift reaction part is combined into one stream via first and second water gas shift reformate passages 40 and 41, externally discharged, passed through a water gas shift reformate/air passage 42 to be mixed with air required for a preferential oxidation so as to obtain a temperature suitable for preferential oxidation, and then introduced into the preferential oxidation reactor 43. While the supplied water gas shift reformate contacts the preferential oxidation catalyst loaded in the preferential oxidation reactor 43, it undergoes preferential oxidation so that the concentration of carbon monoxide in the reformate discharged from the water gas shift reactor is decreased from 0.3-1.0% to 10 ppm or less. At this time, the preferential oxidation catalyst contains at least 0.05 wt % of one or two selected from among Pt, Ru, and Au, the diameter of which has a size ranging from 1/10 to 1/3 of the space defining the water gas shift reaction part, in consideration of pressure drop and reactivity in the pipes. The water gas shift reformate thus obtained is discharged through the outlet 5 of the preferential oxidation reactor 43.

The reformer may further include a heat exchanger at the outside thereof to conduct heat exchange using water which is supplied, thus recovering heat from a finally discharged exhaust gas 2. Thereby, total heat efficiency can increase. That is, six cylindrical pipes are integrated, and therefore, a network for optimal heat exchange may be realized. Such a structure is advantageous because stagnation spaces in the heat stream of the combustion part and the reforming part are not formed, thus increasing the efficiency.

Moreover, the operation of the reformer is explained with reference to the drawings.

FIG. 1 shows the internal structure of the small cylindrical reformer, according to an embodiment of the present invention. The small cylindrical reformer performs two processes, that is, a combustion process and a reforming process. For the combustion process, air and fuel supplied from the inlet 1 are preheated, burned in the combustion chamber 14 using a burner 11 to generate heat, and then uniformly distributed into the first and second combustion gas passages 20 and 21 through the combustion gas distributor 15. While passing through the above passages 20 and 21, the combustion gas transfers heat into the reforming reactor 36, the feed/water superheaters 33, water preheaters 32 and the first air/fuel preheating passage 10, and is then discharged through the exhaust gas outlet 2.

For the reforming process, feed and water supplied from the inlet 3 are introduced into the feed/water preheaters 32 through the first and second exhaust gas passages 30 and 31 to recover heat from the exhaust gas and from the water gas shift reactor, introduced into the feed/water superheaters 33 to recover heat from the exhaust gas and from the reforming reaction reformate obtained through the reforming reaction, and then supplied into the reforming reactors 36 to undergo the reforming reaction. Subsequently, the reforming reaction reformate thus obtained is cooled to a suitable temperature while passing through the first and second reforming reaction reformate passages 37 and 38, and supplied into the water gas shift reactor 39 to undergo the water gas shift reaction so as to obtain a water gas shift reformate, which is then passed through the first and second water gas shift reformate passages 40 and 41 to be discharged, passed through the water gas shift reformate/air passage 42 to be mixed with air required for a preferential oxidation, supplied into the preferential oxidation reactor 43 to remove residual carbon monoxide, and then finally discharged through the water gas shift reformate outlet 5 of the preferential oxidation reactor 43.

The above processes are described in detail below. As the fuel loaded into the air/fuel inlet 1, fossil fuel for reforming is initially used and then mixed with air. During operation, unused offgas in a fuel cell stack is mainly used, and the fossil fuel is auxiliary used to control heat.

The preheated air and fuel are burned using the burner 11 able to safely burn both fossil fuel and offgas of the fuel cell stack to produce carbon dioxide and water, first transfer radiant heat to the peripheral reforming reactors, and are then appropriately distributed through the combustion gas distributor 15. As is apparent from the transverse sectional view of the small cylindrical reformer shown in FIG. 4A, the main reactor is composed of six cylindrical pipes, including a first pipe 12 defining a combustion chamber, a fourth pipe 18 surrounding the whole reactor, and a second pipe 16, a fifth pipe 34, a sixth pipe 35 and a third pipe 17 radially positioned between the first pipe 12 and the fourth pipe 18. The first combustion gas passage 20 is defined into a space between the first pipe 12 and the second pipe 16, and the second combustion gas passage 21 into a space between the third pipe 17 and the fourth pipe 18. Hence, after the combustion gas passing through the above passages 20 and 21 transfers heat to ambient air, the reforming reactors 36, the feed/water superheaters 33, and the feed/water preheaters 32, it is discharged through the exhaust gas outlet. As can be seen in FIG. 1, the combustion gas passed through first and second combustion gas passages 20 and 21 are combined into one stream through an exhaust gas connection passage 22, and are then discharged via an exhaust gas passage 23.

In addition, the feed and water supplied from the inlet 3 are divided between the two feed/water preheaters 32 through the first and second feed/water passages 30 and 31, some of which is supplied into the preheater positioned between the second pipe 16 and the fifth pipe 34, the rest of which is supplied into the preheater positioned between the third pipe 17 and the sixth pipe 35. Therefore, heat may be recovered from the combustion gas and water gas shift reactor 39.

The preheated feed is supplied into the feed/water superheaters 33 to recover heat from the combustion gas and from the reforming reaction reformate, and the superheated feed is supplied into the reforming reactors 36 to undergo the reforming reaction while contacting the loaded steam reforming catalyst and is thus converted into a reforming reaction reformate comprising hydrogen, carbon monoxide, carbon dioxide, unreacted feed, and excess water. The reforming reaction reformate transfers heat to the reforming reactors 36 and the feed/water superheaters 33 while passing through the first reforming reaction reformate passage 37 and the second reforming reaction reformate passage 38, whereby the temperature thereof is decreased.

The reforming reaction reformate appropriately cooled to the temperature required for the water gas shift reaction is supplied into the water gas shift reactor 39 to undergo the water gas shift reaction while contacting the loaded water gas shift catalyst. Thereby, the concentration of carbon monoxide in the above reformate is decreased from 7-15% to 0.3-1.0%. The water gas shift reformate produced through the water gas shift reactor 39 is passed through the first and second water gas shift reformate passages 40 and 41 to be combined into one stream, which is then externally discharged. The discharged reformate is passed through the water gas shift reformate/air passage 42 to be mixed with air 4 required for preferential oxidation so as to have the temperature suitable for preferential oxidation, and is then supplied into the preferential oxidation reactor 43.

Subsequently, the supplied water gas shift reformate is subjected to preferential oxidation while contacting the preferential oxidation catalyst loaded in the preferential oxidation reactor 43 to decrease the concentration of carbon monoxide in the shift reformate obtained using the water gas shift reactor from 0.3-1.0% to 10 ppm or lower, and is then discharged through the outlet 5 of the preferential oxidation reactor 43.

FIG. 2 is a longitudinal sectional view showing the internal structure of a small cylindrical reformer, according to another embodiment of the present invention, in which a preferential oxidation reactor 43 is positioned differently from that shown in FIG. 1 to increase space usage and heat exchange efficiency.

That is, the preferential oxidation reactor 43, which is formed at the outside of the reformer as shown in FIG. 1, may be provided between first air/fuel preheating passages 10 in FIG. 2. When the preferential oxidation reactor 43 is formed between the first air/fuel preheating passages 10, heat exchange between the preferential oxidation reactor 43 and the first air preheating passages 10 is accelerated, thus increasing the total heat efficiency of the system.

FIG. 4B is a transverse sectional view showing the small cylindrical reformer, according to the embodiment of FIG. 2. As shown in this drawing, while the introduced air and fuel are supplied into preheating regions among a first pipe 12, a seventh pipe 44 and an eighth pipe 45 and are then passed through the air/fuel preheating passages 10, heat may be recovered from the preferential oxidation reactor 43 and from the exhaust gas. The above passages may be controlled in the spaces thereof for appropriate heat exchange, into which any metal material able to increase heat exchange efficiency while not decreasing the pressure may be inserted.

That is, a water gas shift reformate produced using a water gas shift reactor 39 is combined into one stream through the passages 40 and 41, and is then supplied into the preferential oxidation reactor 43. The supplied water gas shift reformate is subjected to preferential oxidation in the presence of a preferential oxidation catalyst loaded in the preferential oxidation reactor 43 to decrease the concentration of carbon monoxide in the shift reformate from 0.3-1.0% to 10 ppm or lower, and is thereafter discharged through the outlet 5 of the preferential oxidation reactor 43.

FIG. 3 is a longitudinal sectional view showing the internal structure of a small cylindrical reformer, according to yet another embodiment of the present invention. This small cylindrical reformer comprises a combustion reaction unit including a combustion part to burn air and fuel supplied from an air/fuel inlet 1, a combustion gas distributor 15 to distribute the combustion gas burned in the combustion part, and first and second combustion gas passages 20 and 21 to guide the distributed combustion gas into an outlet 2 to be discharged, and a fuel-converting catalytic reaction unit including two reforming reaction parts each having a reforming catalyst to reform feed and water supplied from a feed/water inlet 3, and a water gas shift reaction part formed between the two reforming reaction parts to conduct a water gas shift reaction able to decrease the concentration of carbon monoxide in a reforming reaction reformate resulting from the reforming reaction, in which the combustion reaction unit and the fuel-converting catalytic reaction unit are integrally structured by six cylindrical pipes to realize optimal heat exchange efficiency.

At the lower portion of the above reformer, a route for supplying the water gas shift reformate passed through the water gas shift reaction part into the preferential oxidation reactor, and a route for supplying feed and water into the reforming reaction parts from the feed/water inlet 3 are designed to overlap each other so as to increase the heat transfer efficiency. Further, the preferential oxidation reactor 43, which is used to decrease the concentration of carbon monoxide in the water gas shift reformate passed through the water gas shift reaction part to a predetermined level or lower, is positioned at the lower portion of the above route, so as to increase the heat transfer efficiency with a second air/fuel preheating passage 52 communicating with the air/fuel inlet 1.

That is, in the reformer according to the present embodiment, an increase in heat transfer efficiency is expected by positioning the preferential oxidation reactor 43 at the lower portion of the reformer. As such, with the aim of obtaining high heat transfer efficiency, a plurality of air/fuel distributors 51 should be provided between the preferential oxidation reactor 43 and the second air/fuel preheating passage 52 for effective heat distribution.

In addition, the preferential oxidation reactor 43 formed at the lower portion of the reformer may be assembled along with the second air/fuel preheating passage 52, and thus, the assembly of the small fuel reformer may be more easily conducted.

FIG. 5 is a schematic view showing a reformer further comprising a heat exchanger, according to an embodiment of the present invention. That is, a small heat exchanger 53 may be additionally provided to the reformer of FIG. 1, to achieve heat exchange between the discharged exhaust gas 2 and water 54 to be supplied, thus increasing the total heat efficiency. In this way, a small heat exchanger 53 may be also additionally provided in the reformer of FIG. 2 or 3, to achieve heat exchange between the discharged exhaust gas 2 and water 54 to be supplied, thus increasing the total heat efficiency.

In the present invention, constituents, such as a catalyst reactor, a combustor, a heat exchanger, etc., were integrated in a single container for an optimal heat exchanging network, thus manufacturing a small cylindrical reformer. When such a reformer was operated, a methane conversion rate was 94% or more, a CO content after the water gas shift reaction was 0.7% or less, and a CO content after the PROX was 10 ppm or less. As well, high heat transfer efficiency was realized.

Further, in the heat transfer efficiency, optimal heat efficiency may be obtained via heat exchange between two or more fluids while conducting combustion reactions in the presence of a catalyst suitable for each reaction. These constituents may be integrated in a single reactor so that the resultant apparatus is structured to have a compact size while minimizing heat loss. In addition, six pipes constituting the apparatus may be designed to be integrated, and thus, easily processed and manufactured.

As described hereinbefore, the present invention provides a small cylindrical reformer. According to the small cylindrical reformer for fuel cell power plants of the present invention, a reforming reactor, a water gas shift reactor (high temperature or low temperature), a combustor, a heat exchanger, a steam generator, etc., may be integrated in a single container, so that an optimal heat exchanging network able to exhibit maximal performance of each constituent is manufactured. Thereby, the resultant reformer is advantageous because it is structured to exhibit minimal heat loss and optimal heat exchange efficiency. In this way, the reformer is designed to have a compact size and be easily processed and manufactured even while having high heat efficiency. In addition, a fluid stream is simplified to minimize stagnation spaces. In consideration of expansion and constriction of the material used due to frequent starting and stoppage, high efficiency, light weight, and mass production are easily realized and durability is also exhibited. Hence, when the reformer is applied to a fuel cell power system, the total power efficiency can be increased. Moreover, since the reformer is lightweight, it can be promptly operated according to initial start-up time or operation capacity change. Also, the reformer can be favorably commercialized through designs able to easily realize mass production and durability.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small cylindrical reformer, comprising:
    six cylindrical pipes coaxially arranged and spaced to form a cylindrical inner space interior to an innermost one of the six cylindrical pipes, and first to fifth annular inner spaces coaxially placed sequentially outwardly between radially adjacent pairs of the six cylindrical pipes;
    a combustion reaction unit including:
        a combustion part formed in the cylindrical inner space to burn air and fuel supplied from an air/fuel inlet,
        a combustion gas distributor formed at a longitudinal end of the cylindrical inner space to distribute a combustion gas generated in the combustion part, and
        a first combustion gas passage formed in the first annular inner space and a second combustion gas passage formed in the fifth annular inner space to guide the distributed combustion gas into an outlet to be discharged; and
    a fuel-converting catalytic reaction unit including:
        two reforming reaction parts respectively formed in the second and fourth annular inner spaces for preparing a reforming reaction reformate, each reforming reaction part having a reforming catalyst to reform feed and water supplied from a feed/water inlet, and
        a water gas shift reaction part formed in the third annular inner space for preparing a water gas shift reformate to decrease a concentration of carbon monoxide in the reforming reaction reformate, wherein:
            the third annular inner space is positioned between the second and fourth annular inner spaces.

2. The reformer as set forth in claim 1, wherein the fuel-converting catalytic reaction unit further comprises a preferential oxidation reactor positioned externally to the six coaxially-arranged cylindrical pipes to decrease the concentration of carbon monoxide in the water gas shift reformate discharged from the water gas shift reaction part.

3. The reformer as set forth in claim 1, wherein the combustion part comprises: a first air/fuel preheating passage, a combustion chamber, and an air preheating tube provided around the air/fuel preheating passage to preheat air.

4. The reformer as set forth in claim 1, wherein the combustion gas distributor is sheet-shaped to uniformly distribute the combustion gas generated in the combustion chamber into the first combustion gas passage and the second combustion gas passage.

5. The reformer as set forth in claim 3, wherein the first air preheating passage, the first combustion gas passage, and the second combustion gas passage have variable spaces between them for optimal heat exchange, into which a heat transfer increasing material formed of metal such that pressure drops only slightly is inserted to increase heat transfer efficiency and a support is provided to maintain a predetermined space and increase heat transfer efficiency.

6. The reformer as set forth in claim 4, wherein the first air preheating passage, the first combustion gas passage, and the second combustion gas passage have variable spaces between them for optimal heat exchange, into which a heat transfer increasing material formed of metal such that pressure drops only slightly is inserted to increase heat transfer efficiency and a support is provided to maintain a predetermined space and increase heat transfer efficiency.

7. The reformer as set forth in claim 1, wherein each of the two reforming reaction parts includes: a feed/water preheater to preheat feed and water supplied from the feed/water inlet; a feed/water superheater to superheat the preheated feed and water; and a reforming reactor to conduct a reforming reaction of the superheated feed and water.

8. The reformer as set forth in claim 7, wherein the reforming catalyst of the reforming reaction part includes an Ni-based steam reforming catalyst or an Ni-based steam reforming catalyst containing at least 0.01 wt % precious metal of Pt or Ru, the diameter of which ranges from $1/10$ to $1/3$ of a space defining the reforming reaction part.

9. The reformer as set forth in claim 7, wherein the feed/water preheater and the feed/water superheater are filled with ceramic balls having a diameter such that pressure drops only slightly.

10. The reformer as set forth in claim 1, wherein the water gas shift reaction part includes:
    a first reforming reaction reformate passage and a second reforming reaction reformate passage to decrease the reforming reaction reformate temperature obtained through the reforming reaction parts to a predetermined level so as to conduct efficient heat exchange; and
    a water gas shift reactor to decrease the concentration of carbon monoxide in the reforming reaction reformate to a predetermined level or lower.

11. The reformer as set forth in claim 10, wherein the water gas shift catalyst of the water gas shift reaction part includes
    an Fe--Cr-based high temperature shift catalyst, a Cu--Zn-based low temperature shift catalyst, or a water gas shift catalyst containing at least 0.01 wt % precious metal of Pt or Pd, the diameter of which ranges from $1/10$ to $1/3$ of a space defining the water gas shift reaction part.

12. The reformer as set forth in claim 10, wherein the first reforming reaction reformate passage and the second reforming reaction reformate passage are filled with a ceramic filler having a diameter such that pressure drops only slightly.

13. The reformer as set forth in claim 2, wherein the preferential oxidation reactor functions to mix the water gas shift reformate with air supplied from an air inlet for preferential oxidation so that the concentration of carbon monoxide in the water gas shift reformate is decreased from 0.3-1.0% to 10 ppm or less, and the preferential oxidation catalyst includes at least 0.05 wt % of one or two selected from among Pt, Ru, and Au, the diameter of which ranges from $1/10$ to $1/3$ of a space defining the water gas shift reaction part.

14. The reformer as set forth in claim 1, wherein a fourth pipe forming the reformer is made of an Al alloy or an Al clad metal to deposit $Al_2O_3$ on an internal surface thereof, or of ceramic material for heat insulation at a high temperature region.

15. The reformer as set forth in claim 14, further comprising
    a heat exchanger outside the reformer to conduct heat exchange using water which is supplied so as to recover heat from a finally discharged exhaust gas and increasing total heat efficiency.

16. The reformer as set forth in claim 14, wherein the two reforming reaction parts perform double heat exchange with the water gas shift reaction part, the first combustion gas passage, and the second combustion gas passage, to optimize heat exchange efficiency.

17. The reformer as set forth in claim 1, further comprising a heat exchanger outside the reformer to conduct heat exchange using water which is supplied so as to recover heat from a finally discharged exhaust gas and increasing total heat efficiency.

18. The reformer as set forth in claim 1, wherein the two reforming reaction parts perform double heat exchange with the water gas shift reaction part, the first combustion gas passage, and the second combustion gas passage, to optimize heat exchange efficiency.

19. The reformer as set forth in claim 18, further comprising a heat exchanger outside the reformer to conduct heat exchange using water which is supplied so as to recover heat from a finally discharged exhaust gas and increasing total heat efficiency.

20. The reformer as set forth in claim 18, wherein the two reforming reaction parts perform double heat exchange with the water gas shift reaction part, the first combustion gas passage, and the second combustion gas passage, to optimize heat exchange efficiency.

21. The reformer as set forth in claim 1, wherein the water gas shift reaction part further comprises:

a first reforming reaction reformate passage and a second reforming reaction reformate passage to decrease a temperature of the reforming reaction reformate; and a water gas shift reactor to decrease the concentration of carbon monoxide in the reforming reaction reformate.

* * * * *